United States Patent Office 3,115,389
Patented Dec. 24, 1963

3,115,389
TREATMENT OF BRINE
Marcel George Deriaz, Widnes, England, assignor to Imperial Chemical Industries Limited, London, England, a corporation of Great Britain
No Drawing. Filed Nov. 27, 1961, Ser. No. 155,173
Claims priority, application Great Britain Dec. 15, 1960
4 Claims. (Cl. 23—89)

This invention relates to the treatment of waste brine from electrolytic processes for the production of sodium amalgam.

The electrolysis of brine to obtain chlorine and sodium amalgam is carried out in electrolytic cells using a mercury cathode and graphite anode. In such processes the brine leaving the cell after electrolysis (usually referred to as waste brine) contains mercury, dissolved chlorine, chlorate, and small amounts of bromine. In order to conserve water and brine it is advantageous to return waste brine to the brine wells. It is necessary, however, before returning the waste brine to the wells to remove substantially all of the mercury from the brine, otherwise contamination of the wells with mercury may occur. In certain cases the removal of mercury from brine being returned to a resaturation system may be desirable and can be carried out by this process.

We have now found that the waste brine can be rendered substantially free from mercury by the precipitation of mercury as mercuric sulphide by treatment in two stages with a material which will introduce sulphide ions into the brine such as a sodium sulphide solution.

The waste brine coming from the mercury cell is acidic and hot. If sodium sulphide solution is added to the brine any chlorine remaining is converted to hydrochloric acid. However, if the addition of sulphide is continued so that a quantity sufficient to precipitate the mercury present in brine is added, no clear end point is obtained with the first small excess of sulphide and hence a large excess of sulphide tends to be added to the brine. This is undesirable as the mercuric sulphide separates in a form difficult to settle and separate. On the other hand, if the brine is made alkaline on leaving the cell and the addition of sulphide carried out, a clear end point is obtained, but sulphur separates due to the reaction between hypochlorite and sulphide. This reaction does not occur in our two-stage addition as little or no chlorine is present having already been converted to hydrochloric acid before the brine is made alkaline.

According to the invention a process for the substantial removal of mercury from waste brine comprises the following steps. The addition to brine containing chlorine of sulphide ions until the redox potential relative to the saturated KCl-calomel electrode is in the range +0.85 volt to +0.93 volt, raising the pH by the addition of alkali to a pH in the range 7–9, preferably 8, then continuing the introduction of sulphide ions into the brine until the redox potential is in the range 0 to −0.2 volt, flocculating the precipitate obtained, settling the precipitate and separating the substantially mercury-free brine.

If desired one can remove substantially all the chlorine present in the brine by air-blowing before applying the sulphide treatment.

In one form of our invention air is blown through the hot waste brine to remove a substantial part of the dissolved chlorine.

Sodium sulphide solution is added to the partially dechlorinated brine which is acidic, i.e., brine with a pH of less than 4. The addition of sodium sulphide is controlled by measuring the redox potential and the addition is stopped once the redox potential is +0.85 volt relative to the saturated KCl-calomel electrode. At this stage the conversion of any halogen present in the brine to the corresponding acid is completed and practically no sulphur is precipitated. The pH of the brine is then raised to 8.0 conveniently for instance by the addition of lime slurry and the addition of sodium sulphide solution is continued until the redox potential is −0.2 volt relative to the saturated KCl-calomel electrode. If the value of −0.2 volt is passed, excess sulphide ions are present in the brine which causes difficulty in the flocculation of the precipitate. At this stage the precipitation of the mercury from the brine as mercuric sulphide is completed. The mixture is then cooled and passed into a tank where a flocculating agent is added if desired and the precipitate is flocculated by agitation with slow-moving paddles. As a result of the controlled addition of sulphide an excess of sulphide ions is avoided and the mercuric sulphide is readily flocculated.

Flocculation will take place readily under these conditions even without the addition of a flocculating agent. The brine is then passed into a settling tank. Settling is preferred to filtration as a large proportion of the material to be removed is so fine that clogging of the filters will occur and high flow rates cannot be used. Once the solids have settled out the purified brine, substantially free from mercury, is returned to the brine wells. It is not essential to treat the brine when hot. The sulphide treatment may be carried out at any lower temperatures down to ambient temperatures.

The following examples illustrate but do not limit the invention.

*Example 1*

Air was blown through hot waste brine from a mercury cell to reduce the chlorine content. The brine contained 4 p.p.m. mercury, had a redox potential of +1.06 volts relative to the saturated KCl-calomel electrode and was at a pH of 3. Sodium hydrosulphide liquor was then added to the partially dechlorinated brine until the redox potential was +0.85 volt. The pH of the brine was raised to 8.5 by the addition of alkali. The redox potential of the brine was then +0.3 volt and sodium hydrosulphide liquor was added until the redox potential was −0.2 volt. The brine was passed through a filter screen, cooled and passed to a flocculating tank where a flocculating agent was added and the brine was agitated with slow-moving paddles for 30 minutes. It was then passed to a settling tank and after 2 hours the solids had separated. The purified brine was removed and found to contain approximately 0.1 p.p.m. of mercury.

*Example 2*

A further treatment was carried out of hot waste brine containing 2 p.p.m. of mercury and at a pH of 2.5. The first stage addition of sodium hydrosulphide liquor was carried out until the redox potential was +0.9 volt and the pH was then raised to 8.6 by the addition of lime slurry. The redox potential of the brine was then +0.4 volt and sodium hydrosulphide liquor was then added until the redox potential was −0.15 volt. The brine was then passed to a flocculating tank where a flocculating agent was added and the brine was agitated with slow-moving paddles for 20 minutes while it was still hot. The flocculated precipitate was then allowed to settle for 20 minutes after which the brine was removed and found to contain approximately 0.25 p.p.m. of mercury.

What I claim is:

1. A process for the substantial removal of mercury from the brine effluent of a mercury cathode electrolytic cell which comprises adding a soluble sulphide which supplies sulphide ions to said brine effluent at a pH less than 4 until the redox potential relative to the saturated KCl-calomel electrode is in the range +0.85 volt to +0.93 volt, then raising the pH by the addition of alkali to a pH in the range 7–9, thereafter continuing the introduction of sulphide ions into said effluent at said pH of 7–9 until the redox potential is in the range 0 to −0.2 volt, the precipitate being then flocculated and settled and the substantially mercury-free brine separated.

2. A process according to claim 1, wherein substantially all the chlorine is removed from the brine effluent by air-blowing before applying the sulphide treatment.

3. A process according to claim 1, wherein lime slurry is used as alkali to raise the pH of the brine effluent after the first addition of sulphide ions.

4. A process according to claim 1, wherein the sulphide ions are added to the brine effluent by the addition of sodium sulphide solution.

References Cited in the file of this patent

UNITED STATES PATENTS 2,860,952     Bergeron et al. _____ Nov. 18, 1958

FOREIGN PATENTS 506,394     Great Britain _____ May 25, 1939